May 19, 1936.  S. S. ROBERTS  2,041,023

MEASURING VALVE

Filed April 26, 1933

Inventor:
SAMUEL S. ROBERTS,
by Ussina & Rauber
his Attorneys.

Patented May 19, 1936

2,041,023

UNITED STATES PATENT OFFICE 2,041,023

MEASURING VALVE

Samuel S. Roberts, Pittsburgh, Pa.

Application April 26, 1933, Serial No. 668,131

2 Claims. (Cl. 184—7)

This invention relates to measuring valves for pressure lubricating systems, such as discharge measured quantities of lubricant to various points of application upon pressure variations in the line or lines supplying the same. One of the objects is to simplify the construction of such valves and to generally make them more reliable. Other objects may be inferred.

Referring to the drawing.

Figure 1:
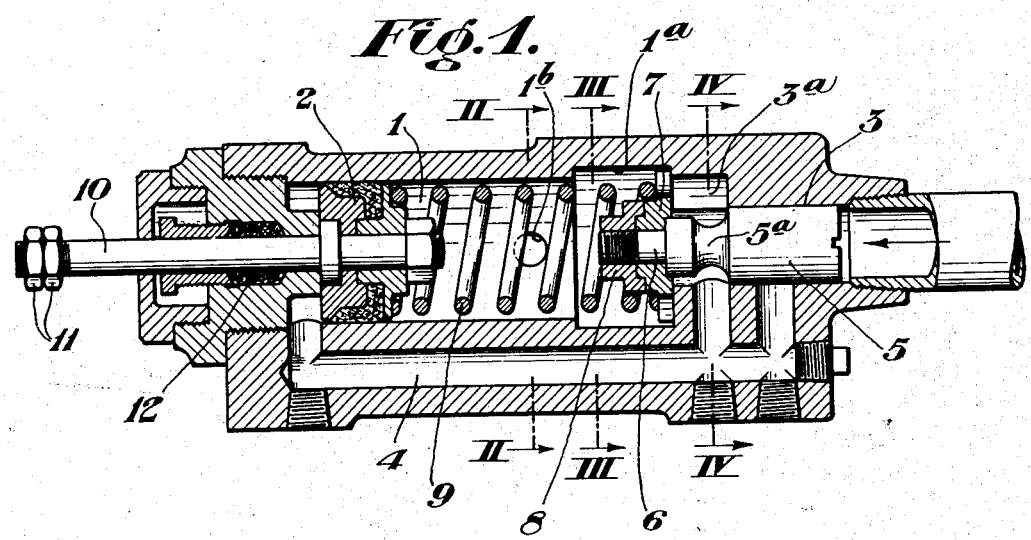
Figure 1 is a longitudinal cross-section of one form of the invention.
Figure 2:
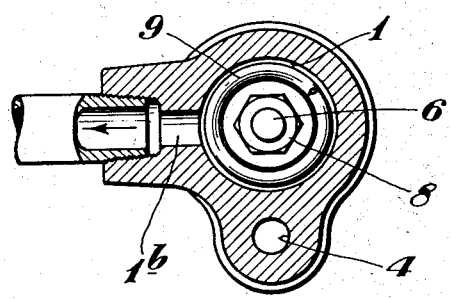
Figures 2, 3 and 4 are lateral cross-sections taken from the respectively Roman numeraled lines in Figure 1.
Figure 3:
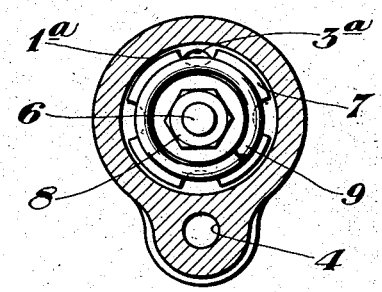
Figure 4:
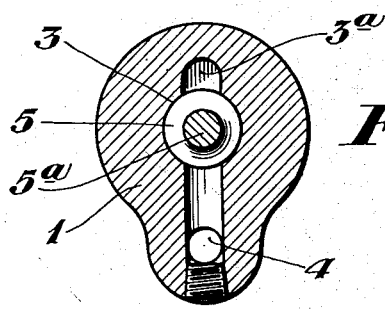

A cylinder 1 contains a piston 2. A passageway 3, of smaller cross-sectional area than the cylinder, extends longitudinally from one of the latter's ends with a by-pass 3ª opening thereinto. A duct 4 opens into the passageway 3 both at a point registering with the by-pass 3ª and at a point therebeyond. It also opens into the opposite end of the cylinder.

A plunger 5 fits the passageway 3 and has a reduced section 5ª registering with the by-pass 3ª when its main body portion covers the duct's opening therebeyond. This plunger includes a connecting part which projects up into the cylinder so as to oppose the piston 2. This part consists of a threaded stem 6 over which an apertured washer 7 is placed and held by a nut 8. The cylinder 1 has a counterbore 1ª which receives this washer and limits the motion of the plunger 5 to its operating range.

A compression spring 9 is arranged in the cylinder 1 between the piston 2 and the connecting part of the plunger 5 so as to push them in opposite directions. The piston itself includes a stem 10 projecting through the end of the cylinder and provided with an adjustable stop in the form of nuts 11 threaded thereon. This stem passes through a stuffing box 12. The cylinder is provided with an outlet 1ᵇ arranged at a point somewhere beyond the working stroke of the piston 2.

In operation, lubricant under pressure is applied to the valve through the passageway 3, the end of which is suitably threaded for application to the lubricating line by the usual connection. This forces the plunger 5 against the compression spring 9, so that it moves to a point where its body covers the by-pass and the opening of the duct 4 registering therewith, and simultaneously frees the duct's opening therebeyond. The lubricant flows through the duct to the other end of the cylinder and forces the piston 2 downwardly against the compression spring 9.

Thus the compression spring functions to operate both the plunger 5, which acts as a reciprocating valve, and the piston 2. Other devices generally use a small auxiliary spring to control the inlet valve. Such a little spring is generally unreliable and, in any event, increases the cost.

When pressure in the line connected to the passageway 3 is released, the spring 9 first functions to push the plunger 5 to its original position, and then pushes the piston 2 so the grease is forced to the other end of the cylinder by way of the duct 4 and its opening registering with the by-pass 3ª, the reduced portion 5ª of the plunger being in a position to permit this. The different sizes of the piston and plunger insure this sequence.

This places the valve in operative condition, and the next introduction of lubricant under pressure to the passageway duplicates the action already described, except that the piston 2 now forces the lubricant through the outlet 1ᵇ to the point of lubrication.

The movement of the piston is visually indicated by the stem 10, and the valve may be adjusted to deliver determinable charges of lubricant by holding a small rule to this stem, measuring its stroke and adjusting the nuts 11 accordingly.

Although a specific form of this invention has been shown and described in accordance with the patent statutes, it is not intended to limit the scope of the invention exactly thereto, except as defined by the following claims.

I claim:

1. A measuring valve comprising a cylinder, a piston in said cylinder, a passageway of smaller area than said cylinder and extending longitudinally from one end thereof with a by-pass opening thereinto, a duct opening into said passageway both at a point registering with said by-pass and at a point therebeyond and also opening into the opposite end of said cylinder, a plunger fitting said passageway with a reduced section registering with said by-pass when its body covers said duct's opening therebeyond and having a connected part projecting up into said cylinder so as to oppose said piston, an outlet opening from said cylinder beyond the limits of said piston's stroke, and a compression spring arranged between said piston and said connected part so as to move them in opposite directions, said plunger being constructed to cut-off communication between said by-pass and said duct when moved by the introduction of matter under pressure to a position where its body leaves said duct's opening therebeyond.

2. A measuring valve comprising a cylinder, a piston in said cylinder, a passageway of smaller area than said cylinder and extending longitudinally from one end thereof with a by-pass opening thereinto, a duct opening into said passageway both at a point registering with said by-pass and at a point therebeyond and also opening into the opposite end of said cylinder, a plunger fitting said passageway with a reduced section registering with said by-pass when its body covers said duct's opening therebeyond and having a connected part projecting up into said cylinder so as to oppose said piston, an outlet opening from said cylinder beyond the limits of said piston's stroke, and a compression spring arranged between said piston and said connected part so as to move them in opposite directions, said piston having a stem projecting through said cylinder and provided with an adjustable stop and said plunger being constructed to cut-off communication between said by-pass and said duct when moved by the introduction of matter under pressure to a position where its body leaves said duct's opening therebeyond.

SAMUEL S. ROBERTS.